United States Patent [19]
Clair

[11] Patent Number: 5,269,915
[45] Date of Patent: Dec. 14, 1993

[54] MAGNETIC SOURCE AND CONDENSER FOR PRODUCING FLUX PERPENDICULAR TO GAS AND LIQUID FLOW IN FERROUS AND NONFERROUS PIPES

[76] Inventor: Colonel Clair, P.O. Box 94321, Las Vegas, Nev. 89199

[21] Appl. No.: 45,036
[22] Filed: Apr. 8, 1993
[51] Int. Cl.$^5$ .................................. C02F 1/48
[52] U.S. Cl. ................................ 210/222; 335/304
[58] Field of Search ............... 210/222; 335/302, 304

[56] References Cited

U.S. PATENT DOCUMENTS

| | | | |
|---|---|---|---|
| 2,652,925 | 9/1953 | Vermieren | 210/1.5 |
| 3,349,354 | 10/1967 | Miyata | 335/209 |
| 3,567,026 | 3/1971 | Kolm | 210/222 |
| 3,608,718 | 9/1971 | Aubrey, Jr. | 209/214 |
| 4,188,296 | 2/1980 | Fujita | 210/222 |
| 4,210,535 | 7/1980 | Risk | 210/222 |
| 4,251,791 | 2/1981 | Yanagisawa et al. | 335/209 |
| 4,265,746 | 5/1981 | Zimmerman, Sr. et al. | 210/695 |
| 4,265,754 | 5/1981 | Menold | 210/222 |
| 4,265,755 | 5/1981 | Zimmerman | 210/222 |
| 4,367,143 | 1/1983 | Carpenter | 210/222 |
| 4,711,271 | 12/1987 | Weisenbarger et al. | 137/827 |
| 4,767,953 | 8/1988 | Furuya et al. | 310/11 |
| 4,946,590 | 8/1990 | Hertzog | 210/222 |
| 4,956,084 | 9/1990 | Stevens | 210/222 |
| 5,052,491 | 10/1991 | Harms et al. | 166/304 |
| 5,055,189 | 10/1991 | Ito | 210/222 |
| 5,078,870 | 1/1992 | Carpenter | 210/222 |
| 5,124,045 | 6/1992 | Janczak et al. | 210/695 |
| 5,186,827 | 2/1993 | Liberti | 210/222 |
| 5,227,683 | 7/1993 | Clair | 310/11 |

FOREIGN PATENT DOCUMENTS

| | | | |
|---|---|---|---|
| 2613601 | 10/1977 | Fed. Rep. of Germany | 210/222 |
| WO81/02529 | 9/1981 | PCT Int'l Appl. | |
| WO89/03808 | 5/1989 | PCT Int'l Appl. | |
| WO91/05971 | 5/1991 | PCT Int'l Appl. | |
| 174152 | 12/1962 | U.S.S.R. | 420/175 |

Primary Examiner—Matthew O. Savage
Attorney, Agent, or Firm—David Pressman

[57] ABSTRACT

A magnetic source and condenser for creating magnetic flux within a ferrous pipe (P) comprises a rectangular magnet (M) having a pair of opposing major faces and a pair of pole pieces (N and S) sandwiching the magnet. The pole pieces each have a foot (Nf and Sf) extending under the magnet and adjacent the pipe. By virtue of the pole pieces and the feet, the magnetic flux from the magnet is condensed before it is applied to the pipe. Thus it is strong enough to exceed the flux-carrying capacity of the pipe so that it travels away from the pipe in an arc (G) inside the pipe where it cuts perpendicularly the fluid flow (F) within the pipe. The flowing fluid cutting the perpendicular lines of magnetic flux generate electrical currents and charges in the fluid, which in turn ionizes the fluid and dissolved and suspended solids in the fluid, and charges the pipe negative to protect the pipe from scale, corrosion, algae, parafinning, etc. A plurality of magnets and condenser units (D) are also mounted on the inside of a circular non-magnetic enclosure (E) in a circumferentially spaced direction and outside an interior pipe (P) which is coaxial with the enclosure.

14 Claims, 1 Drawing Sheet

MAGNETIC SOURCE AND CONDENSER FOR PRODUCING FLUX PERPENDICULAR TO GAS AND LIQUID FLOW IN FERROUS AND NONFERROUS PIPES

BACKGROUND

1. Field of Invention

This invention relates to pipe protectors, specifically to devices for protecting pipes from harmful effects of fluids carried by such pipes.

2. Prior Art

Steel pipes which carry water are normally susceptible to scaling, corrosion, and algae. As a result, the pipes become restricted and weakened so that they carry less fluid, leak, and even burst. The underlying cause is known as "pipe charging": Fluids running in pipes create a static interface with the inside pipe wall, charging it positive (Helmholtz, 1879; Gouy-Chapman, 1910–1913).

Calcium carbonate, which is abundant in water, is attracted to the positively charged pipe. This calcium salt accumulates on the pipe wall to form calcite deposits or pipe scale, which, over time, build up in sufficient amounts to restrict water flow. The positive pipe also attracts the negative oxygen side of the dipolar water molecules; these combine with the pipe's iron to form iron oxide (rust or corrosion) which weakens the pipe. Furthermore, algae, which is attracted to positively charged surfaces, sticks to the pipe. The algae multiplies and forms a thick slime to protect itself while it digests the pipe. The microbiological corrosion eats through the pipe wall, while the protective slime mass grows large enough to reduce the fluid flow and plug strainers and filters. These three effects scaling, corrosion, and algae growth lower the flow rate and efficiency of pipes, and may cause the pipes to leak and even burst.

In the petroleum production industry, crude petroleum deposits frequently occur in highly mineralized aquifers. As a result, most oil wells pump more "hard" water than oil, causing oil well pumps and tubing to become scaled, corroded, and also suffer from some forms of algae. Many crude oils also contain paraffin which is attracted to a positive pump and well tubing and can coat them until they plug and fail from the thick deposits. An additional problem in crude oil production is the separation of the crude oil from the water and dirt that is pumped from the well into a separation tank, as a water, oil and dirt emulsion. In the separation tank, the water and dirt (bottom solids) slowly sink to the bottom and the crude oil rises to the top. This allows the crude oil to be pumped to a refinery and the bottom solids and water can be pumped down an injection well, back into the ground. This last process also scales and corrodes the injection well pumps and tubing.

In water, natural gas, and petroleum product pipelines, another serious problem is external corrosion which is also the result of the above pipe charging phenomenon, which charges the pipe positive.

In the combustion of hydrocarbons, such as gasoline, diesel, oil, and coal slurries, the primary problem is achieving a "clean burn" which requires complete ionization and blending of the fuel and the air mixture. When this is achieved, no potential energy of the fuel is lost and the harmful compounds that result from incomplete combustion are not released into the atmosphere.

In the laundry industry, the primary problem is mineralized or "hard" water which inhibits sudsing, bleaching and rinsing. Another very serious problem is the laundry effluent, which is high in biochemical oxygen demand (BOD), chemical oxygen demand (COD), and suspended solids (SS.)

In the mining industry, especially the precious metals mining industry, the primary problems are leeching the metal out of the ore and processing the toxic effluents.

In the agricultural irrigation industry, the primary problem is delivering water and nutrients to seedling and plant roots.

In the lake, pool, and fountain industry, the primary problems are algae and sanitation.

In all of the above cases, the chemical industries have done their best to try to solve these problems chemically.

In the case of water scaling and corrosion, expensive toxic chemicals, usually acids and very expensive biocides, are generally added to the water to prevent or dissolve and remove these materials from the pipes. Although effective, chemicals are an expensive solution to this worldwide problem, because they must be continuously added to the water supply. More importantly, their manufacture, transportation, and application are energy, water, and labor intensive, and every stage is harmful to both humans and the environment.

In the petroleum industry, expensive solvents and hot oil are pumped down scaled, corroded, and paraffined well tubes, in an effort to dissolve some of the deposits and keep the well pumping a little while longer, before the very expensive necessity of pulling and replacing the pump and tubing. Also, in the separation process, expensive chemical emulsion breakers are constantly added to break the crude oil, water, and dirt emulsion to hasten the separation process. Also acids are pumped down injection wells to dissolve the scale and corrosion.

Pipelines are protected with expensive chemical coatings and covering materials that degrade into the soils. Also, in a process called "Cathodic Protection", Edison half cells or rectifiers are placed at frequent intervals, in an attempt to electrically charge the external surface of the pipeline, negative.

In combustion processes, very expensive chemical fuel additives, precious metal catalytic converters, and huge air scrubbing devices are employed to try to overcome the lack of proper ionization of the burning fuel and air mixture, in a futile attempt to eliminate air pollution.

In the laundry industry, expensive salt and chemical water "softening" is used to exchange the minerals in "hard" water for sodium, from salt. This process creates a tremendous amount of water pollution, by homes as well as industry. There is no chemical cure for commercial laundry effluent.

In the mining industry, expensive and polluting polyphosphates are mixed into placer hydraulic pump waters to reduce the scaling of the pumps, pipes, and nozzles, and expensive and polluting chemical solvents are pumped over ore piles to leech the metals from the ore. Thereafter more chemical emulsion breakers or flotation chemicals are added to the mixture to separate the metals from the chemicals.

In the agricultural irrigation industry, chemicals are added to "hardpan" topsoils to dissolve the calcium that is binding the soil and allow better penetration of the water to the plant roots. Also, expensive colloids and fertilizers are premixed and dissolved for long periods of time, to form a fertilizing solution that can be pumped through the irrigation system.

In the lake, pool and fountain industries, very expensive chemical algacides are added to the water to combat the algaes, without damaging the wildlife or killing fish or humans. Chlorine is the sanitizing chemical oxidizer of choice in pools, lakes and fountains.

In water wells, acids and algacides are pumped down the well tubing to dissolve scaling and corrosion and to kill algaes. If this is no longer effective, the well tubing and pump are pulled.

To alleviate the above problems, magnetic devices have been used for preventing scaling, corrosion, parafinning and algae growth in pipes.

U.S. Pat. Nos. 2,652,925 to Vermeiren (1949), 4,210,535 to Risk (1980), 4,265,746 to Zimmerman, Sr. et al. (1981), 4,265,754 to Menold (1981), and 4,265,755 to Zimmerman (1981), to Harms et al. (1991), to Liberti et al. (1993), together with published International Application PCT/US81/00304 to White Light Industries (1981), and to my prior application Ser. No. 07/833,734, filed Feb. 11, 1993, show magnetic devices which fit around water pipes or liquid containers. These comprise a plurality of magnets with opposite poles spaced axially along the pipes.

With the exception of my device, these magnets cannot project magnetic fields into the interior of ferrous pipes, much less project magnetic fields perpendicular to the direction of water flow, into the interior of ferrous pipes.

According to Faraday's law, a moving conductor, which in this case is the water, generates an electrical current in the conductor when it moves perpendicularly through magnetic flux lines. However, because no current can be generated without the presence of flux lines, perpendicular to the direction of fluid flow, these devices, with the exception of my device, cannot not generate current. This renders them ineffective for charging pipe walls negative to prevent scale, corrosion, parafinning, and algaes. Inducing a high enough magnetic flux into and perpendicular to the water flowing in the pipe will generate electrical currents and charges which will ionize some of the water molecules and the molecules of dissolved and suspended solids.

More importantly, the flux will charge the pipe sufficiently negative to repel calcium carbonate, the oxygen side of water molecules and algaes, to prevent scaling, corrosion, parafinning, and algae growth, respectively. My device also does this, but requires two completely separate units and magnets to induce a perpendicular magnetic field into the pipe.

Harms shows a perpendicular magnetic field projected into a nonmagnetic pipe in FIG. 13, but this does not describe the shortest smooth arcs to the opposite poles, since the maximum distance to each magnet's own opposite pole or ferrous casing 42 in FIG. 3, is much shorter (0.79 cm) than the distance (5 cm) across pipe 76 in FIG. 13, to the other magnets' opposite poles. Also, Harms makes no provision for a pole piece to condense the 10,000 gauss flux of his magnets. Since steel well pipe can absorb 17,000 gauss, laying Harms's magnets against well pipe, as shown in FIGS. 3 and 13, will not apply enough flux to penetrate his pipe.

Liberti shows perpendicular flux lines projected into the interior of a nonmagnetic container for attracting magnetic substances in a fluid. While Liberti uses pole pieces to condense his magnets' flux, his design does not provide a closed magnetic circuit as is necessary to supersaturate and penetrate a ferrous pipe. Since Liberti's magnets don't contact his container, and since his air gaps prevent a closed magnetic circuit, his magnetic fields will not penetrate a ferrous pipe.

OBJECTS AND ADVANTAGES

Accordingly, several objects and advantages of the invention are to provide a device which causes pipes to repel all negative ions such as carbonates, oxygen, paraffins, and algaes, to protect pipes from scale, corrosion, parafinning, and algae growth, respectively. Other objects are to provide such a device which is easy to install and adjust, which is compact, and which is simple and economical to manufacture. Furthermore, this device provides a self-contained ionizer for all ferrous and nonferrous pipes. It ionizes the fluids and the dissolved and suspended solids in those pipes to improve combustion, washing, cleaning and rinsing, crude petroleum emulsion breaking, mining leeching, sedimentation and flotation, irrigative soil penetration and plant nourishment, organic solubility and reactions, nonchemical algae control and increase the available oxygen in water based fluids. This device is also easily installed and adjusted and economical to manufacture. It is self-contained and produces a very dense magnetic field with flux lines entirely perpendicular to the direction of fluid flow, which charges pipes negative.

Further objects and advantages will become apparent from a study of the following description and the accompanying drawings.

DRAWING FIGURES

Figure 1:
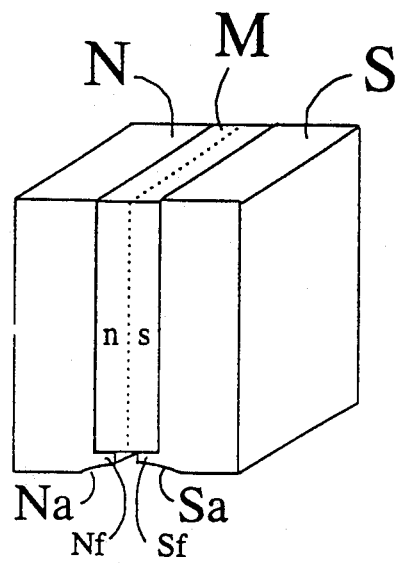
FIG. 1 is a perspective view of a magnetic condenser comprising a steel north pole piece N, a magnet M magnetized through its thickness, and a south pole piece S, in accordance with my invention.

| Drawing Reference Characters | | |
|---|---|---|
| N. North pole piece. | Na. North pole piece contact. | Nf. North pole piece foot. |
| M. Magnet. | n. North pole of magnet M. | s. South pole of magnet M. |
| S. South pole piece. | Sa. South pole piece contact. | Sf. South pole piece foot. |
| P. Pipe. | G. Gauss or magnetic flux lines. | F. Fluid flow direction |
| A. Magnet height. | B. Magnet width. | C. Magnet thickness. |
| D. Complete device of FIG. 1. | E. Enclosure casing. | |

DESCRIPTION/FIG. 1/BASIC MAGNETIC SOURCE AND CONDENSER

In accordance with a preferred embodiment of the invention shown in FIG. 1, a magnetic source comprises a flat, square neodymium iron boron (Nd-Fe-B) magnet M having an extremely high flux density, about 12,000 gauss and having left and right major faces or surfaces and a bottom face or surfaces extending between the major faces. Magnet M is charged so that its left face is one pole, e.g., north, and its right face is the opposite pole, e.g., south, as indicated by letters n and s.

Attached to the left surface or north pole of magnet M is a magnetically saturated steel concentrator or pole piece N and attached to the right surface or south pole of magnet M is a magnetically saturated steel concentrator or pole piece S. As shown, each pole piece has a pair of opposed major faces, one of which is an inner major face and the other of which is an outer major face. Each outer major face has an area that is larger than, and extends beyond its corresponding major face of the magnet M. Each major inner face has an area that is equal to the major face of said magnet. On the lower inside edge of each pole piece are feet, Nf and Sf, respectively, which project under and support the magnet and keep it away from a supporting surface (to be described). The projection of each foot also brings each pole's contact area into close proximity with the other pole. Below each foot are longitudinal and concave cuts Na and Sa, or contact areas, whose arcs have the same radii as the radius of the outside diameter of a pipe, to be described. As shown, the surface of each foot which is distal from magnet M is in contact with and conformingly mates with the outside, convex surface of pipe P, while the opposite, proximal surface of each foot is contiguous the bottom surface of magnet M. The feet extend toward each other and each foot has an end which is spaced from the end of the opposite foot. These cuts maximize surface contact with the pipe.

All parts are held together magnetically. However adhesives or other nonmagnetic fastening means can be used for additional rigidity. The ideal material for the pole pieces would be pure iron because of its very low reluctance (magnetic resistance), but it is too soft to be practical in commercial applications. Since carbon is used to harden iron into steel, and this addition of carbon causes a resistance to magnetic fields, the next best choice is high-quality, low-carbon cold-rolled steel. The lowest carbon cold rolled steel that is generally available contains 18% to 20% carbon, and is specified as ASTM A108 in the United States. The pole pieces are nickel, chrome, or ni-cad plated, while the exposed sides of magnet M are polymer coated to prevent corrosion. Also, nonmagnetic covers and coatings can be used to further protect the poles and the magnet from the elements.

DESCRIPTION/FIG. 2/SOURCE-CONDENSER MOUNTED ON PIPE

Figure 2:
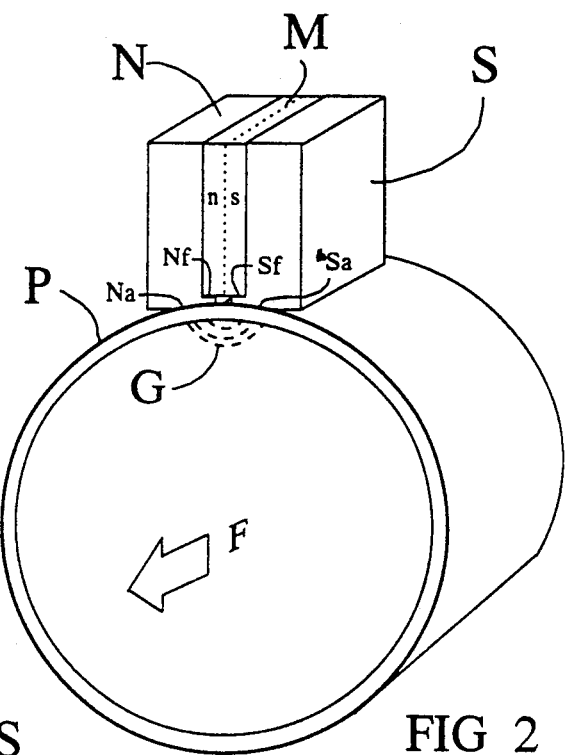
FIG. 2 is a perspective view of the condenser of FIG. 1 fitted onto a pipe P through which a fluid is flowing in a direction F, in accordance with my invention.

In FIG. 2, the source and condenser of FIG. 1 is shown placed on a pipe P, where a very dense magnetic field flows from the north pole n, of magnet M. The field magnetically saturates north pole piece N, travels down through contact area Na which is less than half the area of magnet M. This condenses the field to the maximum magnetic carrying capacity of the steel of pole piece N. The field then travels down through the pipe's wall and toward contact area Sa. Because the steel used in domestic and commercial pipe has a higher magnetic reluctance than the steel of the pole piece and because the circumference of the arc of contact Na is over twice as wide as the thickness of pipe wall P, the applied field magnetically over- or supersaturates the pipe's wall and induces surplus magnetic lines of force G inside the pipe. Force lines G follow the shortest smooth arc across the magnetically supersaturated area of the pipe's wall, to the area directly under the contact area Sa of pole piece S. The field then travels up through the pipe wall at that point and then up through contact area Sa of pole piece S. The field magnetically saturates pole piece S, and returns to south pole s of magnet M, to complete the magnetic circuit.

In one embodiment pipe P was 10 cm in outside diameter (OD), the height A and width B of magnet M (FIG. 3) was 5 cm and its thickness was about 1 cm. Each pole piece was about 5 cm wide by 3.8 cm thick by 5.7 cm high. The dimensions of feet Nf and Sf were 0.3 cm wide by 0.3 cm high by 5 cm long, and contact areas Na and Sa had 5 cm radii and 2 cm arc circumferences to conformingly fit against pipe P and supersaturate the pipe's 1 cm wall.

DESCRIPTION/FIG. 3/DETAIL OF MAGNET AND POLE PIECE

Figure 3:
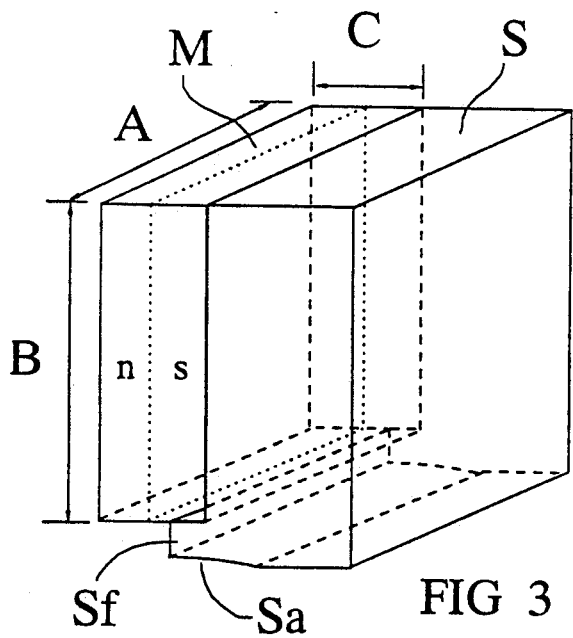
FIG. 3 is an enlarged perspective view of magnet M and the south pole piece S of the condenser of FIG. 1, in accordance with my invention.

FIG. 3 is an enlarged view of magnet M and pole piece S, showing the essential proportional relationships that are important to the magnetic source and condenser's operation. In all embodiments, the thickness of each pole piece should preferably be equal to about 75% of the height B, of magnet M, to increase the flux density in the pole piece to about 18,000 gauss; the width and height of the foot of each pole, Nf and Sf, respectively, should preferably be equal to 33% of the thickness C of magnet M, to support magnet M and bring pole pieces N and S to their closest practical proximity, without shorting. The circumference of the arc of each pole's contact, Na and Sa, respectively, should preferably be equal to or less than 50% of the height A of magnet M, to increase the flux density on the pipe wall to more than 20,000 G; the circumference of the arc of each pole's contact, Na and Sa, respectively, should preferably be equal to or greater than 200% of the thickness of any steel pipe wall intended to receive the condenser. For instance, in the embodiment of FIG. 2, with a 10 cm × 10 cm × 1 cm magnet, each pole piece foot was 0.3 cm wide by 0.3 cm high, and the arc of each contact was cut on a 5 cm radius, and each arc's circumference was 2 cm long.

Operation/FIG. 2

When the preferred embodiment of the magnetic source and condenser shown in FIGS. 1 and 2, is installed upon a commercial steel water pipe, it will induce magnetic flux G into the interior of pipe P which is perpendicular to the fluid flow F. This causes the fluid to generate electrical currents and charges within the fluid according to Faraday's law. These currents and charges, which are easily measured with a digital multimeter, not only ionize the fluid and the dissolved and suspended solids in the fluid, but they also charge the pipe negative, since it is acting in conjunction with the magnetic condenser as the negative "field" of a Faraday generator.

The magnetic source and condenser is a single magnet unit able to penetrate a commercial steel pipe wall with dense, perpendicular magnetic flux lines. Its pole pieces, with their projections draw the magnetic flux lines into the closest possible proximity, without shorting. Their machined arced contacts not only mate perfectly with each pipe's outside surface, but create a magnetic flux condensing ratio between the magnet's face, the contact area, and the pipe wall's thickness, that guarantees super-saturation of the pipe wall area between the condenser's pole contacts. A resulting dense magnetic flux induction into the pipe's interior is always completely perpendicular to the fluid flow direction in the pipe.

Because all lengths of flux lines G are completely perpendicular to the direction of water flow F, they are always cut by the moving water at the maximum, and thus the most efficient, angle to generate the maximum electrical current possible.

As a result pipe P will be negatively charged with respect to its fluid. Such negative charge will repel all negative ions, such as carbonates, oxygen, and paraffins. Therefore scale corrosion and paraffining are prevented.

Furthermore, negatively charged pipe P repels algae, which needs a positively charged surface to which to attach. As a result, pipe P is kept clean, to maintain its flow capacity and structural strength. If pipe P is already encrusted with scaling, corrosion, paraffin, and algae, the magnetic source and condenser can rid the pipe of these harmful materials. A negatively charged pipe P also causes the positive hydrogen in water to combine with the calcite deposits. These deposits then dissolve into calcium bicarbonate and water, which are carried away by the water stream. Therefore, scaling is removed and further deposits are prevented.

Negatively charged pipe P also causes the positive hydrogen in the water to combine with iron oxide, or rust, to dissolve the corrosion into water and iron, which are carried away by the water stream.

Furthermore, the positively charged water and negatively charged pipe P interfere with algae cell division, which prevents any attached algae from maintaining its slime layer and from continuing its growth. Therefore, the algae quickly dies and is carried away by the water stream, while further algae attachment or growth is repelled and prevented by the negative pipe.

Since the magnetic source and condenser is small, multiple units can be placed circumferentially around a pipe, or longitudinally along the length of a pipe, to provide maximum protection.

Figure 4:
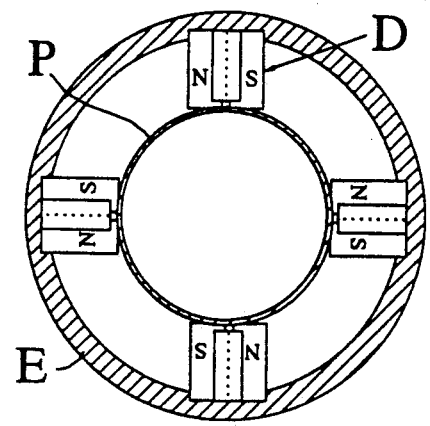
FIG. 4 is a cutaway view of four devices D, of FIG. 1, installed on a well pipe P, and recessed into the inner wall of a nonmagnetic enclosure E, in accordance with my invention.

FIG. 4/Installation Around Well Pipe

FIG. 4 shows several devices D placed around well pipe nipple P. Devices D are recessed in and protected by a nonmagnetic case or enclosure E, that has end caps (not shown) that seal enclosure E and well pipe nipple P. Devices D perform the identical operation described above, preventing scale, corrosion and algae in water well pipes, and preventing scale, corrosion, paraffin and algae in oil well pipes. Enclosure E will fit down all standard oil and water well casings, and the end (not shown) of pipe nipple P is threaded so that nipple P can be coupled to a pump or between any sections of well pipe.

Summary, Ramifications, and Scope

Accordingly the reader will see that I have provided an improved magnetic source and condenser which acts as a nonchemical pipe protector. It protects all fluid carrying pipes, including, but not limited to, cooling, heating, culinary, laundry, irrigation, swimming pool, fountain and potable water pipe, as well as crude oil, natural gas, gasoline, diesel, and fuel oil pipes. It may be used to project a magnetic field into the stream of water within a pipe, such that the water cuts through all the flux lines perpendicularly, for most efficiently charging the pipe negative. It may be used to prevent scale, corrosion, parafinning, and algae growth in fluid carrying pipes. It may be used to dissolve and remove calcite scaling, corrosion or rust, paraffin and algae in already damaged pipes, so as to clear the pipes and prevent further damage. It may be used to provide more effective and economical cathodic protection to cross-country water, natural gas, and petroleum pipelines. It eliminates the recurring cost and need for conventional pipe treatments with expensive toxic chemicals. It may be used to promote more efficient and less polluting combustion. It may be used to replace salt and chemical water softening, by ionizing hard water and reducing water tension to provide better cleaning, bleaching, sudsing and rinsing, with hard water. It may also be used to improve irrigation and fertilizing efficiencies, and for nonchemical algae control, to reduce or eliminate chemical water treatment, in cooling, heating, decorative, agricultural, irrigation, effluent and placer mining water systems, and to save large amounts of potable water, now wasted in chemically treated cooling systems. It may be used to generate power by introducing electrodes into the fluid stream to conduct the generated current outside the pipe. It uses only one magnet to achieve very high efficiency. It is highly compact, such that multiple units may be fitted around or along a pipe for even greater effectiveness. It is magnetically and therefore easily installed onto steel pipes, while it may be easily machined to fit pipes of various diameters. It may be used to protect non-ferrous pipes. Furthermore, it is simple and very economical to manufacture.

While the above descriptions are specific, they should not be considered as limitations on the scope of the invention, but only as examples of the preferred embodiment. Many other ramifications and variations are possible within the teachings of the invention. For example, a different type of permanent magnet, of a different material, shape, or an electromagnet, may be used. The parts may be shaped differently. The magnet and pole pieces can be long and rectangular, instead of square. The source and condenser may be covered with a nonmagnetic housing or coated with protective nonmagnetic coatings. The device may be strapped or otherwise fastened onto non-ferrous pipes to protect those pipes. Cutouts Na and Sa may be extended flat surfaces if pipe is rectangular.

Thus the reader is requested to determine the scope of the invention by the appended claims and their legal equivalents, and not by the examples given.

I claim:

1. A magnetic source and condenser for protecting a pipe, ionizing any fluid flowing therein, and ionizing any dissolved and suspended solids in such fluid, comprising:

a magnetic source including a magnet having a pair of opposed planar major faces and a planar minor face extending between said major faces and perpendicular to said major faces, said magnet being charged so that one of said major faces is a south pole and the other of said major faces is a north pole, a magnetic condenser a pair of pole pieces, each of said pole pieces having a pair of opposed planar major faces, one of which is an inner major face and the other of which is an outer major face, the area of said inner major faces being equal to that of the major faces of said magnet, the area of said outer major face being larger than each of said major faces of said magnet, said pole pieces being positioned on opposite sides of said magnet such that said pole pieces sandwich said magnet, said inner major face of each pole piece is contiguous with and completely covers an entire major face of said magnet, and said outer major face of each pole piece faces away from said magnet, each pole piece having an integral foot extending perpendicularly to said inner major face of each pole piece such that said pole pieces have two respective integral feet which extend toward each other and are substantially coplanar, each foot having a distal and a proximal surface with respect to said magnet, each foot having an end which is spaced from the end of the opposite foot, said distal surface of each foot having a predetermined concave curvature which will conformingly mate with an outside surface of a pipe having a predetermined convex curvature, said proximal surface of each foot being contiguous with said minor face of said magnet, whereby when said magnet and pole pieces are positioned upon a pipe with said distal surface of each foot in contact with said pipe and with said pole pieces spaced circumferentially around said pipe, said magnet and pole pieces will cause magnetic lines of flux to be generated within said pipe in a direction perpendicular to the direction of any fluid flow within said pipe, so that any fluid flowing inside said pipe will cut said magnetic lines of flux to generate desirable current in said fluid that will charge said pipe negatively with respect to said fluid and ionize said fluid and any dissolved and suspended solids in such fluid, so as to reduce scaling, corrosion, and algae buildup in said pipe.

2. The device of claim 1 wherein said magnet has a flux density of about 12,000 gauss.

3. The device of claim 1 wherein said magnet is made of neodymium iron boron.

4. The device of claim 3 wherein said distal surface of each foot is circular in cross section.

5. The device of claim 1, further including at least a second magnetic source, a second condenser, and a nonmagnetic cylindrical enclosure having an inner wall and a central axis, each magnetic source and condenser being mounted at circumferentially spaced locations upon said inner wall of said enclosure so that said distal surface of each foot faces said central axis of said enclosure.

6. A magnetic source, condenser, and pipe, wherein said pipe is protected from harmful effects, comprising:

a magnetic source including a magnet having a pair of opposed planar major faces, and a planar minor face extending between said major faces and perpendicular to said major faces, said magnet being charged so that one of said major faces is a south pole and the other of said major faces is a north pole, a magnetic condenser including a pair of pole pieces, each of said pole pieces having a pair of opposed planar major faces, one of which is an inner major face and the other of which is an outer major face, the area of said outer major face being larger than each of said major faces of said magnet, the area of said inner major faces being equal to that of the major faces of said magnet, said pole pieces being positioned on opposite sides of said magnet such that said pole pieces sandwich said magnet, said inner major face of each pole piece is contiguous with and completely covers a major face of said magnet, and said outer major face of each pole piece faces away from said magnet, each pole piece having an integral foot extending perpendicularly to said inner major face of each pole piece such that said pole pieces have two respective integral feet which extend toward each other and are substantially coplanar, each foot having a distal and a proximal surface with respect to said magnet, each foot having an end which is spaced from the end of the opposite foot, said distal surface of each foot having a predetermined concave curvature which will conformingly mate with an outside surface of a pipe having a predetermined convex curvature, said proximal surface of each foot being contiguous with said minor face of said magnet, whereby when said magnet and pole pieces are positioned upon a pipe with said distal surface of each foot in contact with said pipe and with said pole pieces spaced circumferentially around said pipe, said magnet and pole pieces will cause magnetic lines of flux to be generated within said pipe in a direction perpendicular to the direction of any fluid flow within said pipe, so that any fluid flowing inside said pipe will cut said magnetic lines of flux to generate desirable current in said fluid that will charge said pipe negatively with respect to said fluid and ionize said fluid and any dissolved and suspended solids in such fluid, thereby to reduce scaling, corrosion, and algae buildup in said pipe, and said magnetic source and said pair of pole pieces being mounted upon said pipe so that said feet are spaced circumferentially around said pipe.

7. The invention of claim 6 wherein said pipe is made of ferrous material.

8. The invention of claim 6 wherein said pipe is made of non-ferrous material.

9. The device of claim 6 wherein said magnet has a flux density of about 12,000 gauss.

10. The device of claim 6 wherein said magnet is made of neodymium iron boron.

11. The device of claim 10 wherein said distal surface of each foot is circular in cross section.

12. The device of claim 10 wherein said pipe has a predetermined wall thickness and wherein distal surface of each foot has a dimension equal to or greater than twice said wall thickness of said pipe.

13. The device of claim 6, further including at least a second magnetic source and a second condenser, each magnetic source and condenser being mounted adjacent said pipe so that said feet extend in a circumferential direction around said pipe, each of said feet having a concave curved bottom surface shaped to conformingly mate with the outside surface of said pipe, and a nonmagnetic cylindrical enclosure, each magnetic source and condenser being mounted at circumferentially spaced locations upon an inner wall of said enclosure so that said distal surface of each foot faces said pipe and a central axis of said enclosure and so that each magnetic source and condenser are circumferentially spaced around said pipe.

14. The device of claim 6, further including at least a second magnetic source and a second condenser comprising a second magnet and a second pair of pole pieces sandwiching said second magnet similar to said first-named magnet and first-named pair of pole pieces, and also including a nonmagnetic cylindrical enclosure surrounding and concentric to said pipe, each magnet and pair of pole pieces being mounted upon an inner wall of said enclosure, said first-named magnet and said first-named pair of pole pieces being mounted at a circumferentially spaced location from said second magnet and said second pair of pole pieces, upon said inner wall of said enclosure so that said distal surface of each foot faces a central axis of said enclosure, so that said distal surface of each foot faces said pipe, and so that each magnet and sandwiching pair of pole pieces are circumferentially spaced around said pipe.

* * * * *

UNITED STATES PATENT AND TRADEMARK OFFICE
CERTIFICATE OF CORRECTION

PATENT NO. : 5,269,915
DATED : Dec. 14, 1993
INVENTOR(S) : Colonel Clair

It is certified that error appears in the above-indentified patent and that said Letters Patent is hereby corrected as shown below:

Col. 8, line 61, change "condenser" to —condenser including —.

Signed and Sealed this

Sixteenth Day of August, 1994

Attest:

BRUCE LEHMAN

*Attesting Officer*   *Commissioner of Patents and Trademarks*